United States Patent [19]

Tokunaga

[11] Patent Number: 4,733,071

[45] Date of Patent: Mar. 22, 1988

[54] OPTICAL ENCODER WITH VARIABLE FIBER/PHASE ANGLE ADJUSTMENT

[75] Inventor: Ichiro Tokunaga, Furukawa, Japan

[73] Assignee: Alps Electric Co., Ltd., Japan

[21] Appl. No.: 45,199

[22] Filed: Apr. 30, 1987

Related U.S. Application Data

[63] Continuation of Ser. No. 663,217, Oct. 22, 1984, abandoned.

[30] Foreign Application Priority Data

Oct. 21, 1983 [JP] Japan ............................. 58-197285

[51] Int. Cl.$^4$ .............................................. G01D 5/34
[52] U.S. Cl. ........................... 250/231 SE; 250/237 G
[58] Field of Search ............ 250/231 SE, 237 G, 239, 250/227; 356/395; 33/125 C; 340/347 P

[56] References Cited

U.S. PATENT DOCUMENTS

| | | | |
|---|---|---|---|
| 3,344,700 | 10/1967 | Brake | 250/237 G |
| 3,902,063 | 8/1975 | Oelsch et al. | 250/231 SE |
| 4,096,383 | 6/1978 | Mancini et al. | 250/227 |
| 4,097,150 | 6/1978 | Wu | 250/237 G |
| 4,139,889 | 2/1979 | Ingels | 340/347 P |

*Primary Examiner*—David C. Nelms
*Attorney, Agent, or Firm*—Guy W. Shoup

[57] ABSTRACT

An optical encoder comprises a sensor head provided with a light emission portion and first and second light reception portions sandwiching the light emission portion therebetween, and a code member on which a plurality of reflective portions are formed at a predetermined pitch, the sensor head being arranged such that the first light reception portion, the light emission portion, and the second light reception portion successively face the code member with respect to the direction of movement of the reflective portions of the code member, and such that an azimuth angle of the light emission and light reception portions with respect to the direction of movement of the reflection portions of the code member can be changed, whereby two output having a predetermined phase difference can be obtained by suitably setting the azimuth angle of the light emission and light reception portions.

4 Claims, 8 Drawing Figures

OPTICAL ENCODER WITH VARIABLE FIBER/PHASE ANGLE ADJUSTMENT

This is a continuation application from application Ser. No. 663,217, filed Oct. 22, 1984, now abandoned.

BACKGROUND OF THE INVENTION

1. Field of the Invention

The present invention relates to an optical encoder for detecting the revolution velocity of an electric motor, and the velocity, the position, the direction of movement, etc., of a rotating portion or a linearly moving portion of various kind of devices.

2. Description of Prior Art

Conventionally, a rotary encoder has been used as means for detecting the revolution velocity, etc., of a rotary mechanism portion of a motor or other various kinds of devices by using a pulse signal, and a linear encoder has been used to detect the velocity, the position, or the like, of a linearly moving member also by using a pulse signal.

A conventional optical rotary encoder is shown in FIG. 1 (front view) and FIG. 2 (right side view). In this rotary encoder, a code disk 2 is fixedly attached on a rotary shaft 1. This rotary shaft 1 is coupled to an object to be measured so that the code disk 2 is rotated together with the object to be measured. As seen in FIG. 1, a plurality of detection holes 2a are bored in the code disk 2. These detection holes 2a are formed through the code disk 2 and circumferentially continuously arranged at a predetermined circumferential distance. The detection holes 2a are actually continuously formed along the entire circumferential area in the code disk 2, while only eight holes are illustrated in FIG. 1.

A light emission element 3 and a light reception element 4 are disposed to oppose to each other in the same axis at one and the other side of the code disk 2 respectively. Upon rotation of the code disk 2, the light emitted from the light emission element 3 impinges upon the disk 2 and detected by the light reception element 4 when any one of the holes 2a comes to the detection position, that is on the above-mentioned axis of disposition of the light emission and light reception elements 3 and 4. Thus, pulses are produced from the light reception element 4 at a frequency corresponding to the revolution of the code disk 2.

In such a rotary encoder as described above, in order to detect the direction of rotation of the code disk 2, or to multiply the output signal, it is necessary to take out two kinds of output signals different in phase from each other. In order to obtain such two kinds of output signals, conventionally, two sets of light emission and light reception elements are used to perform detection at the two points A and B in FIG. 1. Further, conventionally, a phase shift plate 5 is used in order to obtain two outputs different in phase from each other at the points A and B respectively. The phase shift plate 5 is constituted by a fan-like fixed plate provided with holes 5a bored at a distance different from the array pitch of the detection holes 2a. Thus, the respective time points where any two of the detection holes 2a pass the detection points A and B directly above the holes 5a offset with each other. Thus, a phase difference as seen in FIG. 3 occurs between the detection outputs of the respective light reception elements 4 at the points A and B. In order to process the two outputs as shown in FIG. 3 as a trigonometric function and to perform the signal multiplying processing by using the two outputs obtained at the points A and B, it is required that the phase shift between the outputs is (90°×n) (n being an integer). In the example of FIG. 3, the output obtained at the point B is behind by 90°, that is ¼ of the period T, than the output obtained at the point A.

In the conventional rotary encoder, however, two outputs different in phase are taken out by setting the relative position between the holes 5a bored in the phase shift plate 5 and the detection holes 2a in the code disk 2 and therefore it is required to work the phase shift plate 5 with accuracy. Further, in fixing the phase shift plate 5, it is necessary to position the phase shift plate 5 relative to the code disk 2 with high accuracy, resulting in troublesome adjusting working. In addition to these disadvantages as described above, the conventional rotary encoder has a further disadvantage that the cost thereof is high and in the case where the disposing pitch of the detection holes 2a in the code disk 2 is changed, it is uneconomically required to form a new phase shift plate 5.

SUMMARY OF THE INVENTION

An object of the present invention is to eliminate the disadvantages in the conventional rotary encoder, in view of the circumstances described above.

Another object of the present invention is to provide an optical encoder in which different phase outputs can be desiredly taken out through simple adjusting work and the setting of this phase difference can be changed continuously.

According to an aspect of the present invention, the optical encoder comprises a sensor head provided with a light emission portion and first and second light reception portions sandwiching the light emission portion therebetween, and a code member on which a plurality of reflective portions are formed at a predetermined pitch, the sensor head being arranged such that the first light reception portion, the light emission portion, and the second light reception portion successively face the code member with respect to the direction of movement of the reflective portions of the code member, and such that an arrangement or azimuth angle of the light emission and light reception portions with respect to the direction of movement of the reflection portions of the code member can be changed, whereby two outputs having a predetermined phase difference therebetween can be obtained by suitably setting the azimuth angle of the light emission and light reception portions.

Other objects and advantages of the present invention will be apparent from the following description taken in connection with the accompanying drawings.

BRIEF DESCRIPTION OF THE DRAWINGS

FIGS. 4 to 8 show an embodiment of the present invention in which:

FIG. 4 is an explanatory diagram showing the outline of the optical encoder;

FIG. 5 is a developed plan view typically showing the principle of detection when viewed in the direction of arrow V in FIG. 4;

FIG. 6 is a diagram showing the same as FIG. 5 when viewed in the direction of arrow VI in FIG. 4;

FIG. 7 is the same diagram as FIG. 6 showing the state in which an azimuth angle has been set;

FIG. 8 is an explanatory diagram showing a graph illustrating the relation between the phase difference and the azimuth angle.

DESCRIPTION OF PREFERRED EMBODIMENT

Referring to FIGS. 4 to 8, an embodiment of the present invention will be described hereunder.

Figure 4:
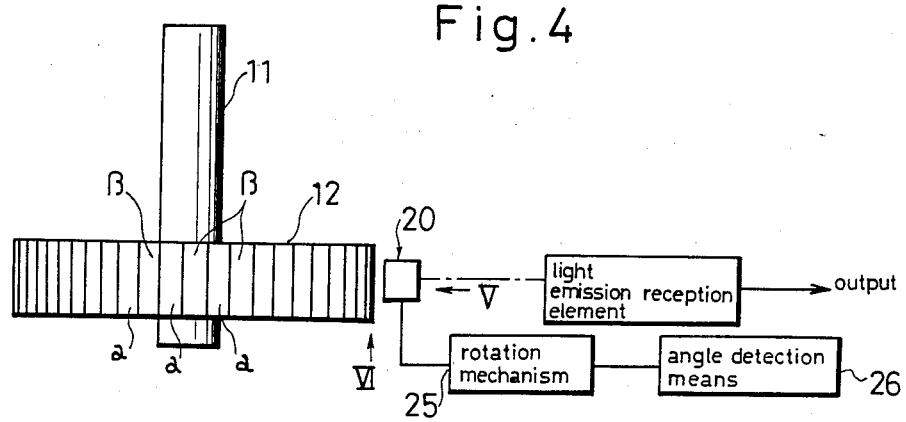

FIG. 4 is an explanatory diagram showing the outline of the optical encoder. This optical encoder is a kind of rotary encoder in which a code disk 12 is fixedly attached on a rotary shaft 11. Reflection portions $\alpha$ and $\beta$ are alternately formed on the outer circumferential surface of the code disk 12. The reflection portions $\alpha$ and $\beta$ are formed along the entire length of the outer circumferential surface at a predetermined pitch. The reflection portion $\alpha$ may be a mirror plane which can reflect a detection light or a white colored surface portion, while the reflection portion $\beta$ may be a black colored surface or the like to absorb the detection light.

Figure 6:
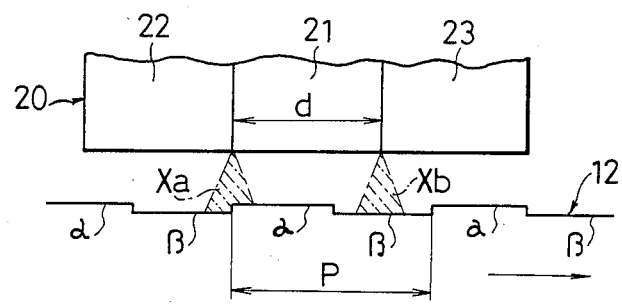

A sensor head 20 is provided to face the outer circumferential surface of the code disk 12. A light emission portion 21 and two light reception portions 22 and 23 are provided on the sensor head 20 (FIG. 6). Each of the light emission portion 21 and the light reception portions 22 and 23 is constituted by a tip of an optical fiber of a plastic material. The light emission portion 21 is connected to a light emission element and the two light reception portions 22 and 23 are connected to separately provided light reception elements, each through the optical fiber. Two light reception outputs are derived from the individual light reception elements. The two light reception portions 22 and 23 are respectively disposed at both sides adjacent to the light emission portion 21 and aligned in the order of the light reception portion 22, the light emission portion 21 and the light reception 23.

The sensor head 20 is provided with a rotation mechanism 25 so that the sensor head 20 can be rotated about the substantially central portion of the light emission portion 21 (the pivotal axis is not essential to be set at the strict center of the light emission portion) step by step by a very small angle. The the axis of rotation is indicated by a mark O in FIGS. 5 and 7. The angle of revolution of the sensor head 20 can be read by a angle detection means 26. The rotation mechanism 25 and the angle detection means 26 may be embodied in various ways. As an example of the rotation mechanism 25, the forward portion of the sensor head 20, at which the light emission portion 21 and the light reception portions 22 and 23 are provided, may be rotatably mounted relative to the rear portion of the sensor head 20. As an example of the angle detection means 26, it is considered that a vernier scale used, for example, for slide calipers or a micrometer is provided on a side surface of a rotation boundary portion between the forward portion and the rear portion of the sensor head 20 to thereby read the rotation angle of the forward portion relative to the rear portion. Alternatively, the rotation angle of the forward portion relative to the rear portion may be detected by means of electrical means utilizing a resistance value or the like.

Next, description will be made hereunder with respect to the operations of setting the output phase difference and detecting the rotation in the optical encoder having the arrangement as described above.

Figure 5:
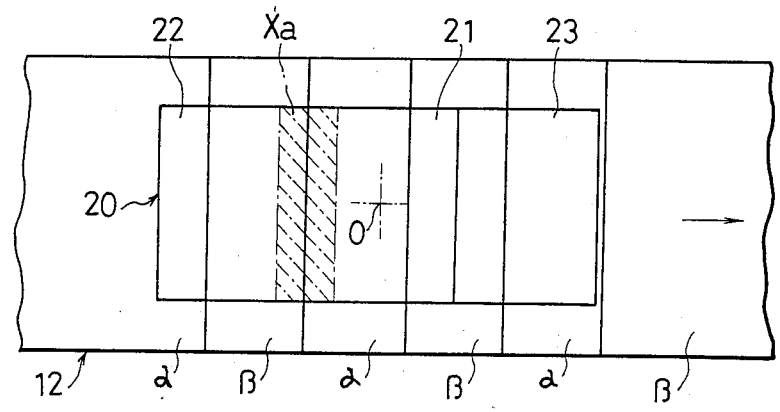
Figure 7:
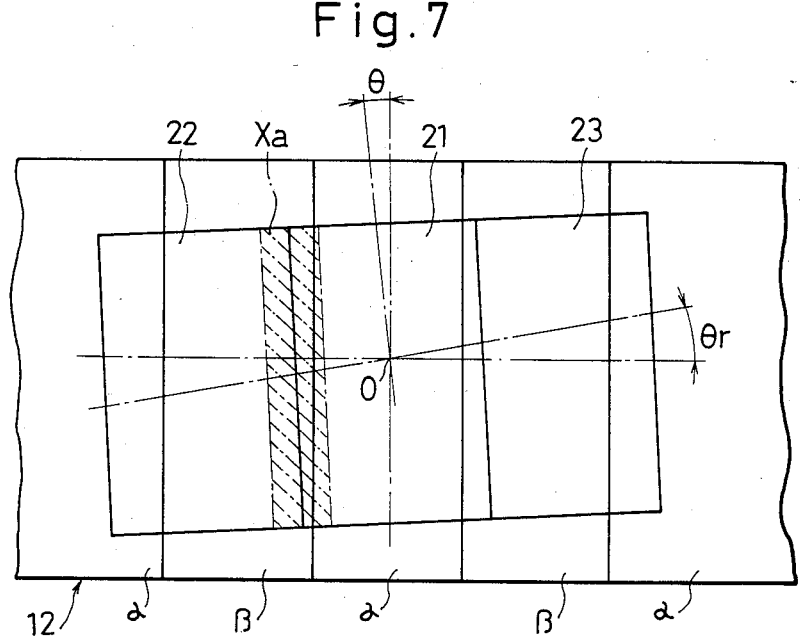

FIG. 5 shows the state of the sensor head 20 facing the outer circumferential surface of the code disk 12 when viewed from the direction of arrow V in FIG. 4, and FIG. 6 shows the same when viewed from the direction of arrow VI in FIG. 4. Further, FIG. 7 shows the state where the sensor head 20 is rotated in FIG. 5. Since the distance between the light emission portion 21 and each of the light reception portions 22 and 23 is smaller than the diameter of the code disk 12, FIG. 6 is drawn on the assumption that the reflective portion $\alpha$ and the non-reflective portion $\beta$ are linearly moved right in the drawing. Accordingly, the following description applies to the case where an elongated member which is linearly moved is used as a code member in place of the disk-like code member such as the code disk 12.

Figure 1:
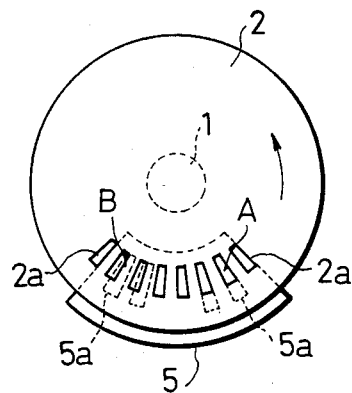
FIG. 1 is a front view of a conventional optical encoder.
Figure 2:
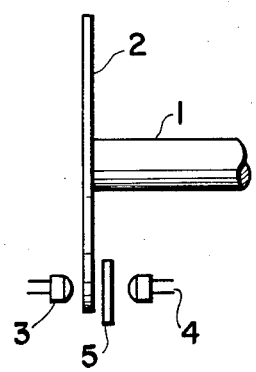
FIG. 2 is a right side view of the optical encoder of FIG. 1.
Figure 3:
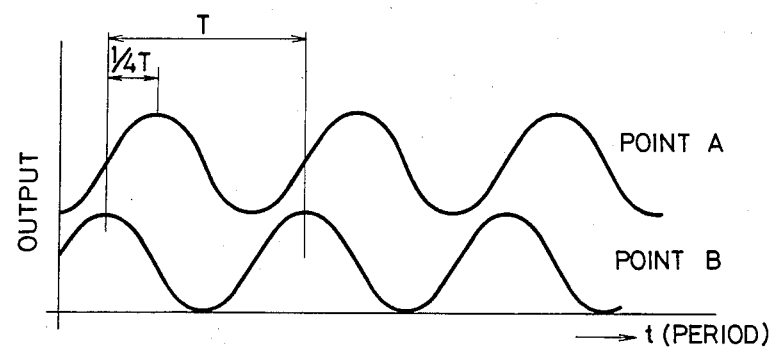
FIG. 3 is an explanatory diagram showing a graph illustrating the phase difference between two detection outputs.

In FIGS. 5 and 6, shown is the state in which the sensor head 20 has an arrangement angle or azimuth angle is zero. That is, the light reception portion 22, the light emission portion 21 and the light reception portion 23 are aligned with no inclination relative to the direction of movement of the reflective portion $\alpha$ and the non-reflective portion $\beta$. Further, FIG. 7 shows the state in which the sensor head 20 is rotated by using the rotation mechanism 25 so that the arrangement angle or azimuth angle is set to $\theta_r$. First, description will be made as to the case where the rotary shaft 11 is coupled to the object to be measured and the code disk 12 is rotated together with the object to be measured in the state of FIGS. 5 and 6. The light from the light element through the optical fiber is emitted out of the light emission portion 21, reflected by the outer circumferential surface of the code disk 12, impinges upon the respective light reception portions 22 and 23, and detected as two output signals by the light reception elements respectively connected to the light reception portions through the corresponding optical fibers. In FIGS. 5 and 6, the designation Xa and Xb represented effective detection regions. That is, in the amount of light emitted from the light emission portion 21, the reflection light in the region Xa is detected by the forward light reception portion 22 and the reflection light in the region Xb is detected by the behind light reception portion 23. Accordingly, in the case where the reflective portion $\alpha$ and the non-reflective portion $\beta$ are moved right in the drawing, the light reflected by the reflective portion $\alpha$ impinges upon the light reception portion 22 when the reflective portion $\alpha$ comes in the region Xa and the light refrected by the reflective portion $\alpha$ impinges upon the light reception portion 23 when the reflective portion $\alpha$ comes in the region Xb. On the other hand, when the non-reflective portion $\beta$ comes in the region Xa or Xb, the light reception portion 22 or 23 receives no light, respectively. Thus, the light signals received by the respective light reception portions 22 and 23 are detected by the separately provided light reception elements so as to produce two pulse outputs as shown in FIG. 3. The two outputs can be obtained as a trigonometric function correponding to the pitch of arrangement of the reflection portion $\alpha$ and the non-reflection portion $\beta$. There occurs a phase difference between the two outputs corresponding to the distance between the two effective detection regions Xa and Xb. The phase difference in the case the azimuth angle is set to zero as in FIGS. 5 and 6 can be obtained in accordance with the following expression:

$$\theta_0 = 360° \times (d/p) \tag{1}$$

where $\theta_0$ represents the above-mentioned phase difference as an angle with respect to the above-mentioned trigonometric function, d represents the distance between the two effective detection regions Xa and Xb, that is the dimension of width of the light emission portion 21, and p represents the pitch of arrangement of the reflective portion $\alpha$ and the non-reflective portion $\beta$ on the code disk 12.

Figure 8:
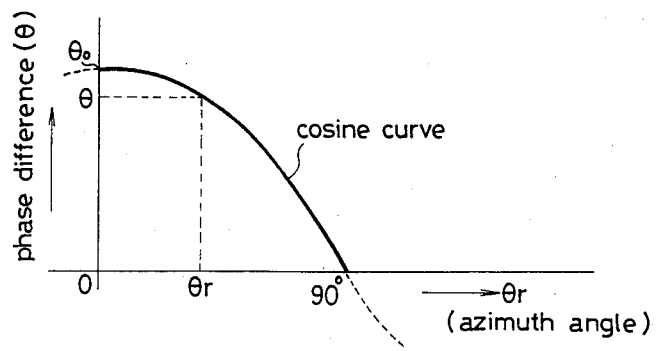

Then, as shown in FIG. 7, the sensor head 20 is rotated about the substantially central point O in the light emission portion 21 by the rotation mechanism 25 to set the azimuth angle $\theta_r$. This azimuth angle $\theta_r$ is read by the angle detection means 26. As the azimuth angle becomes larger, the effective detection regions Xa and Xb are gradually inclined to approach the horizontal or right-left axis in the drawing. At this time the phase difference between the two outputs becomes smaller in comparison with the case where the azimuth angle $\theta_r$ is zero as in FIG. 5. As the result of experiments, it has been found that the relation between the thus changable phase difference $\theta$ and the azimuth angle $\theta_r$ can be expressed as a cosine function as shown in FIG. 8 and by the following equation:

$$\theta = \theta_0 \times \cos\theta_r \tag{2}$$

If $\theta_0$ is eliminated from the equations (1) and (2), $$\theta = 360° \times (d/p) \times \cos\theta_r$$

That is, the phase difference $\theta$ between the two detection outputs can be set to a desired value by suitably changing the azimuth angle $\theta_r$ which is set, as shown in FIG. 7, by the rotation mechanism 25 and the angle detection means 26.

As already stated, the description made above equally applies to the case where a rotary encoder is employed as well as in the case where a linear encoder is employed. The same also applies to the case where the reflective portion $\alpha$ and the non-reflective portion $\beta$ are provided at the side surface of the code disk 12 in place of the outer circumferential surface of the same disk 12.

In the arrangement as described above, the present invention has various advantages as listed up as follows:

(1) Since the sensor head is rotatably supported such that the arrangement angle or azimuth angle of the light emission and light reception portions is made changeable relative to the direction of movement of the code member by detecting the rotation angle of the sensor head, the phase difference between the two outputs can be desiredly set. Thus, the phase difference can be accurately set to an integer multiple of 90° to thereby make it possible to effectively perform the multiplication processing of signal, etc.

(2) The setting of phase difference is facilitated so that the adjusting work in advance of measurement, etc., is made easy in comparison with the conventional technique in which the phase difference is obtained by providing a fixed phase shift plate.

(3) Since the phase difference can be continuously changed by changing the rotational angle of the sensor head, the same mechanism can be used in the case where the pitch of the reflection portions on the code member is different, thereby providing a general purpose encoder.

I claim:

1. In an optical encoder having a code member on which a plurality of indicia portions are arranged at a predetermined pitch spacing, means for moving said code member and said indicia portions in one moving direction, and an optical sensor disposed relative to said indicia portions of said code member in order to derive two output signals having a phase difference between them, the improvement wherein said indicia portions are alternating light reflective and non-reflective portions, said sensor comprises a signal head disposed proximate one side of said code member facing said indicia portions and having arranged in a row along a sensor axis a light emission portion between two light reception portions closely adjacent on each side thereof such that light emitted by said light emission portion is reflected by said reflective portions and not reflected by said non-reflective portions and the reflection and non-reflection of light by said alternating portions moving in said moving direction is detected by said two light reception portions to provide two output signals having a phase difference between them, said light emission and light reception portions being constituted by tip ends of optical fibers arranged in close contact with each other along the sensor axis, and the other ends of the optical fibers being connected to light emission element and light reception elements, respectively, which are remote from the sensor head, and means for rotating said sensor head in order to adjust an azimuth angle between the sensor axis and the moving direction of the indicia portions of said code member such that a predetermined phase difference between the two output signals is obtained.

2. An optical encoder according to claim 1, wherein said light emission portion has a width along said sensor axis of d separating said light reception portions, said reflective portions have a pitch spacing of p, the azimuth angle is $\theta r$, and the phase difference obtained between the two output signals is given by: $360° \times (d/p) \times \cos\theta r$, and is an integer multiple of 90°.

3. An optical encoder according to claim 1, in which said code member includes a rotary disk and said reflective portions are arranged circumferentially on said rotary disk.

4. An optical encoder according to claim 1, in which said code member includes an elongated member and said reflective portions are linearly aligned on the surface of said elongated member.

* * * * *